(12) United States Patent
Ni

(10) Patent No.: US 8,561,754 B2
(45) Date of Patent: Oct. 22, 2013

(54) SEISMIC SOURCE WITH POSITIVE REFLECTION PLATE AND METHOD

(75) Inventor: Yuan Ni, Massy (FR)

(73) Assignee: Cggveritas Services SA, Massy Cedex (FR)

( * ) Notice: Subject to any disclaimer, the term of this patent is extended or adjusted under 35 U.S.C. 154(b) by 0 days.

(21) Appl. No.: 13/606,717

(22) Filed: Sep. 7, 2012

(65) Prior Publication Data

US 2013/0098704 A1    Apr. 25, 2013

(30) Foreign Application Priority Data

Oct. 24, 2011 (FR) ...................................... 11 59608

(51) Int. Cl.
*G01V 1/00* (2006.01)

(52) U.S. Cl.
USPC .......................................... 181/110; 367/153

(58) Field of Classification Search
USPC .......................................... 181/110; 367/153
See application file for complete search history.

(56) References Cited

U.S. PATENT DOCUMENTS

| | | | |
|---|---|---|---|
| 4,721,180 A * | 1/1988 | Haughland et al. ........... | 181/111 |
| 4,831,599 A * | 5/1989 | Dragsund et al. ............. | 367/15 |
| 5,144,588 A * | 9/1992 | Johnston et al. .............. | 367/16 |
| 5,157,636 A * | 10/1992 | Bjerkoy ......................... | 367/15 |
| 5,963,507 A * | 10/1999 | Barr et al. ...................... | 367/15 |
| 6,011,753 A * | 1/2000 | Chien ............................. | 367/21 |
| 6,903,998 B2 * | 6/2005 | Vaage ............................. | 367/24 |
| 7,480,204 B2 * | 1/2009 | Robertsson et al. ........... | 367/19 |
| 8,427,901 B2 * | 4/2013 | Lunde et al. ................... | 367/23 |
| 2008/0037372 A1 * | 2/2008 | Schneider et al. ............. | 367/137 |
| 2010/0110829 A1 | 5/2010 | Lansley et al. | |

FOREIGN PATENT DOCUMENTS

| | | |
|---|---|---|
| GB | 826 932 | 1/1960 |
| GB | 1 161 525 | 8/1969 |
| GB | 2459585 A | 11/2009 |
| WO | 9917473 | 4/1999 |
| WO | 2009005939 A1 | 1/2009 |

OTHER PUBLICATIONS

GB Search Report mailed Feb. 21, 2013 in related Application GB1219015.3.
Preliminary Search Report issued on Jul. 13, 2012 in related French Application No. 1159608.

* cited by examiner

*Primary Examiner* — Forrest M Phillips
(74) *Attorney, Agent, or Firm* — Patent Portfolio Builders, PLLC

(57) ABSTRACT

A marine source sub-array and method for generating a pressure wave in a body of water. The marine source sub-array includes a float configured to float in the body of water; base plates connected to the float through cables; plural individual source elements connected to the base plates and configured to generate pressure waves underwater; and a coverage plate located between the plural individual source elements and the float. The coverage plate has a surface area larger than a surface area of the float.

20 Claims, 13 Drawing Sheets

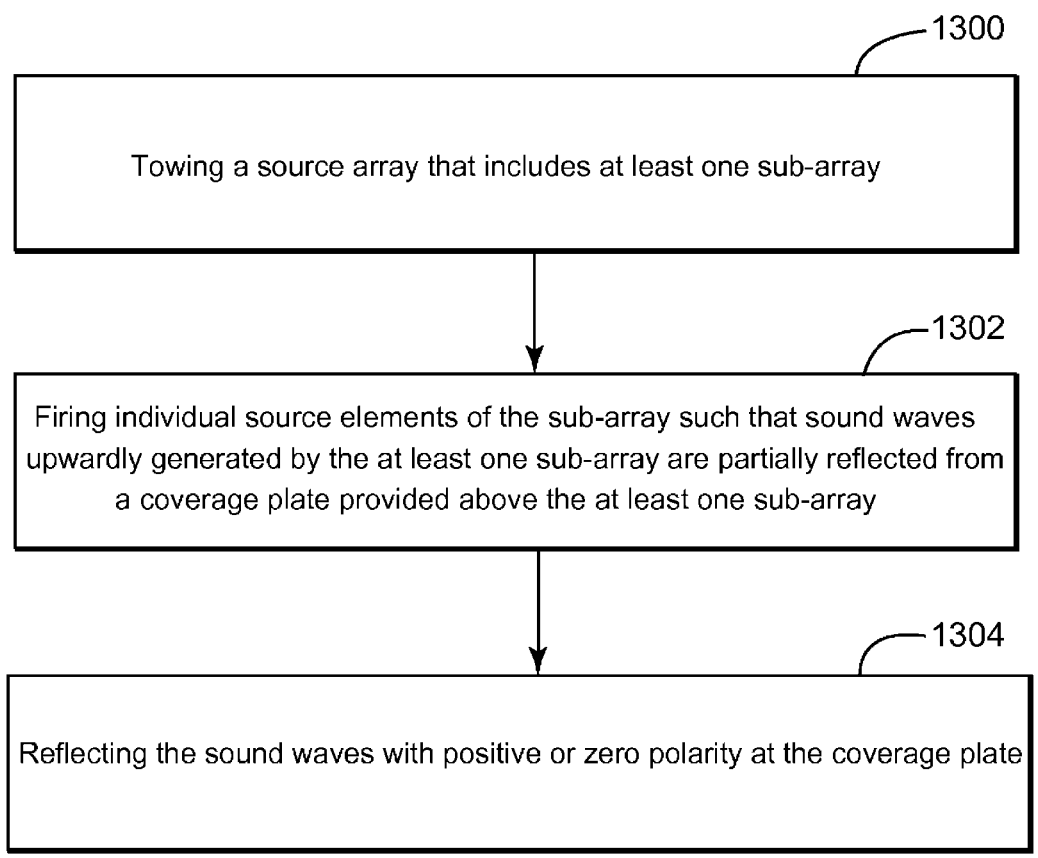

SEISMIC SOURCE WITH POSITIVE REFLECTION PLATE AND METHOD

BACKGROUND

1. Technical Field

Embodiments of the subject matter disclosed herein generally relate to methods and systems and, more particularly, to mechanisms and techniques for providing a seismic source with a positive reflection plate while being towed in water by a vessel.

2. Discussion of the Background

Marine seismic data acquisition and processing generate a profile (image) of a geophysical structure under the seafloor. While this profile does not provide an accurate location of oil and gas reservoirs, it suggests, to those trained in the field, the presence or absence of these reservoirs. Thus, providing a high-resolution image of the geophysical structures under the seafloor is an ongoing process.

Reflection seismology is a method of geophysical exploration to determine the properties of earth's subsurface, which is especially helpful in the oil and gas industry. Marine reflection seismology is based on using a controlled source of energy that sends the energy into the earth. By measuring the time it takes for the reflections to come back to plural receivers, it is possible to evaluate the depth of features causing such reflections. These features may be associated with subterranean hydrocarbon reservoirs.

A traditional system for generating the seismic waves and recording their reflections off the geological structures present in the subsurface is illustrated in FIG. 1. A vessel 10 tows an array of seismic receivers 11 provided on streamers 12. The streamers may be disposed horizontally, i.e., lying at a constant depth relative to the surface 14 of the ocean. The streamers may be disposed to have other than horizontal spatial arrangements. The vessel 10 also tows a seismic source array (or simply a source) 16 that is configured to generate a seismic wave 18. The seismic wave 18 propagates downward toward the seafloor 20 and penetrates the seafloor until eventually a reflecting structure 22 (reflector) reflects the seismic wave. The reflected seismic wave 24 propagates upward until it is detected by the receiver 11 on the streamer 12. Based on the data collected by the receiver 11, an image of the subsurface is generated by further analyses of the collected data.

The seismic source array 16 includes one or more individual source elements. Such individual source elements may include an air gun, water gun, a vibratory source, etc. The individual source elements may be grouped in one or more sub-arrays. The totality of sub-arrays forms the seismic source. Traditionally, a seismic source has three sub-arrays.

FIG. 2 shows a vessel 100 towing two source arrays 110a and 110b (it is also possible to tow only one source array or more than two source arrays but, for simplicity, the novel features are discussed with regard to two source arrays) and plural streamers 120. The streamers 120 include receivers 121 that are configured to record signals generated by the source arrays and reflected by the subsurface. The streamers are connected to the vessel through lead-ins 122 while the source arrays 110a and 110b are connected through cables 112 to the vessel 100. Each source array 110a or 110b may include sub-arrays 114, each sub-array having plural individual source elements 116. Deflectors 140 are provided on the sides of this arrangement to maintain a transverse distance (relative to the path of the vessel) between the streamers 120. The deflectors 140 are connected to the vessel 100 via wide tow cables 142, and spread ropes 144 are used to separate the streamers from each other. It is noted that the terms "rope" and "cable" and "wire" are used sometimes interchangeably in this document. Thus, these terms should not be construed in a narrow sense but rather as those skilled in the art would expect. The number of streamers or individual source elements is exemplary and not intended to limit the applicability of the novel concepts.

The traces recorded by the receivers of the streamers are affected by an effect that limits the accuracy of inferring the structure and composition of the subsurface. This effect, known as source ghosting, arises because water has a higher density and higher propagation velocity of pressure waves than the air above the water surface. Because of these factors, when the source array is activated, acoustic energy is generated and propagates from the source array along various (up, down, left, right, etc.) directions that originate at the source array. In other words, part of the acoustic energy travels downward and interacts with the subsurface while another part travels upward to the water surface. Because the water surface acts as a mirror, this energy is reflected back into the water and travels downward to also interact with the subsurface. The water-air interface reflected acoustic energy is delayed in time and is also shifted in phase by about 180 degrees from the directly downward-propagating acoustic energy. The acoustic energy that is interface-reflected and travels downward is commonly known as the "ghost" signal.

The ghost signal interferes with the directly downward-propagating signal, causing constructive interference in some parts of the frequency band and destructive interference in other parts of the frequency band. The destructive interference causes the apparition of notches in the spectrum recorded by the recorders. The frequencies of these notches are related to the depth at which the source arrays are disposed. The presence of the notches reduces the available spectrum. Thus, source ghosting reduces the effectiveness of the recorded spectrum, which is undesirable.

There are various methods in the field for dealing with source ghosting. Most of these methods involve using additional streamers, or firing the sources following a certain recipe, or having the sources placed at various depths into the water, and/or using time-consuming mathematical algorithms for removing the ghost signal during processing. However, all these methods result in a cost increase in the seismic survey, which is undesirable in a competitive market.

Accordingly, it would be desirable to provide a source array that removes (partially or totally) the ghost effect without substantially increasing the cost of a seismic survey.

SUMMARY

According to one exemplary embodiment, there is a marine source sub-array for generating a pressure wave in a body of water. The marine source sub-array includes a float configured to float in the body of water; base plates connected to the float through cables; plural individual source elements connected to the base plates and configured to generate pressure waves underwater; and a coverage plate located between the plural individual source elements and the float. The coverage plate has a surface area larger than a surface area of the float.

According to another exemplary embodiment, there is a marine source sub-array for generating a pressure wave in a body of water. The marine source sub-array includes a float configured to float in the body of water; base plates connected to the float through cables; and plural individual source elements connected to the base plates and configured to generate pressure waves underwater. A reflection coefficient of the float for pressure waves coming from the body of water is zero or positive.

According to still another exemplary embodiment, there is a marine source array for generating a pressure wave in a body of water. The marine source array includes three source sub-array configured to be towed by a vessel. At least one source sub-array includes a float configured to float in the body of water, base plates connected to the float through cables, plural individual source elements connected to the base plates and configured to generate sound waves underwater, and a coverage plate located between the plural individual source elements and the float. The coverage plate has a surface area larger than a surface area of the float.

According to yet another exemplary embodiment, there is a method for performing a seismic survey in a body of water. The method includes a step of towing a source array that includes at least one sub-array; a step of firing individual source elements of the sub-array such that sound waves upwardly generated by the at least one sub-array are partially reflected from a coverage plate provided above the at least one sub-array; and a step of reflecting the sound waves with positive or zero polarity at the coverage plate.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 13 is a flowchart of a method for generating sound pressures that are reflected from a coverage plate according to an exemplary embodiment.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a source array being towed by a vessel. However, the embodiments to be discussed next are not limited to this source array, but may be applied to other seismic elements.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
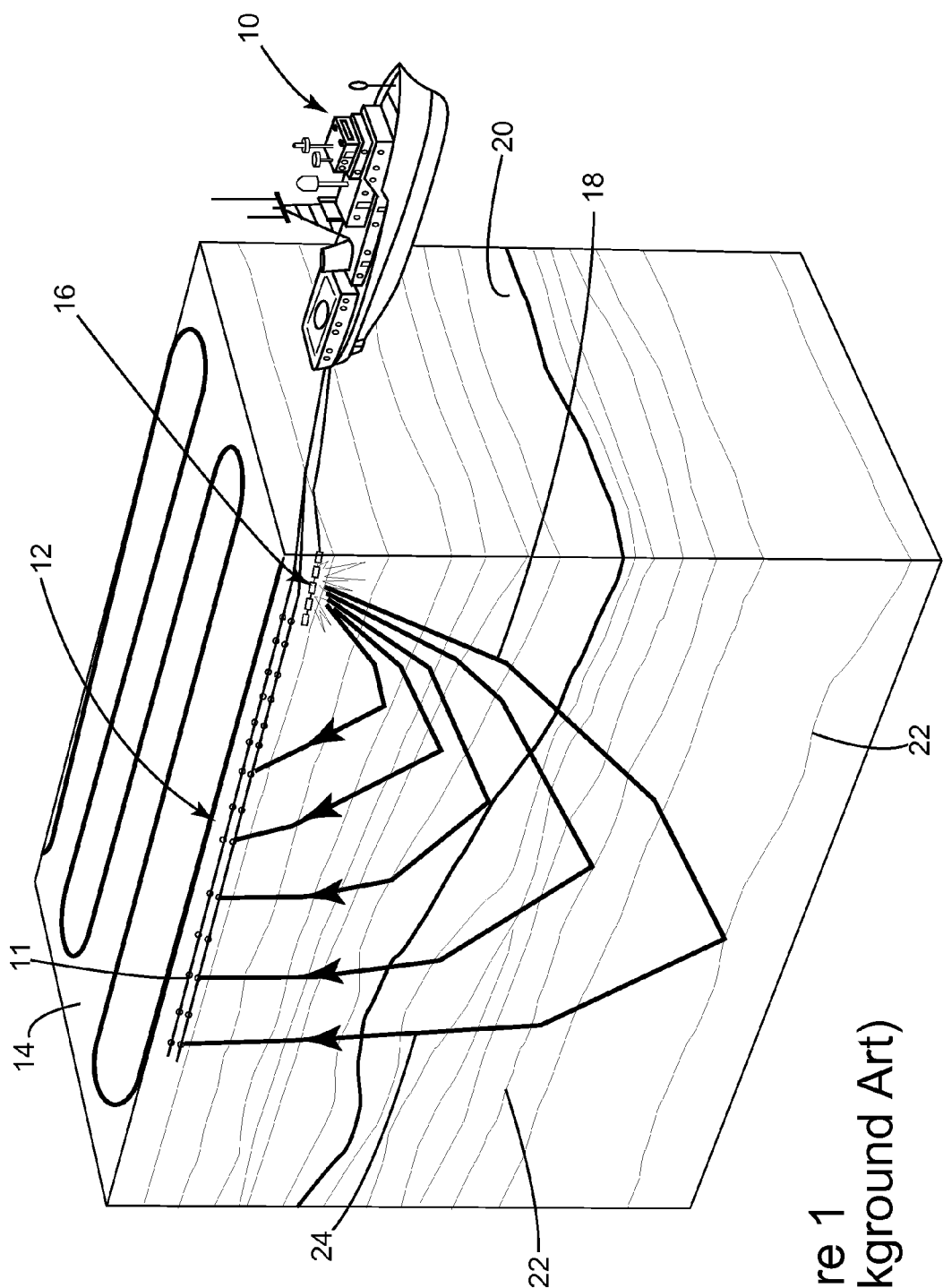
FIG. 1 is a schematic diagram of a conventional seismic survey system.
Figure 2:
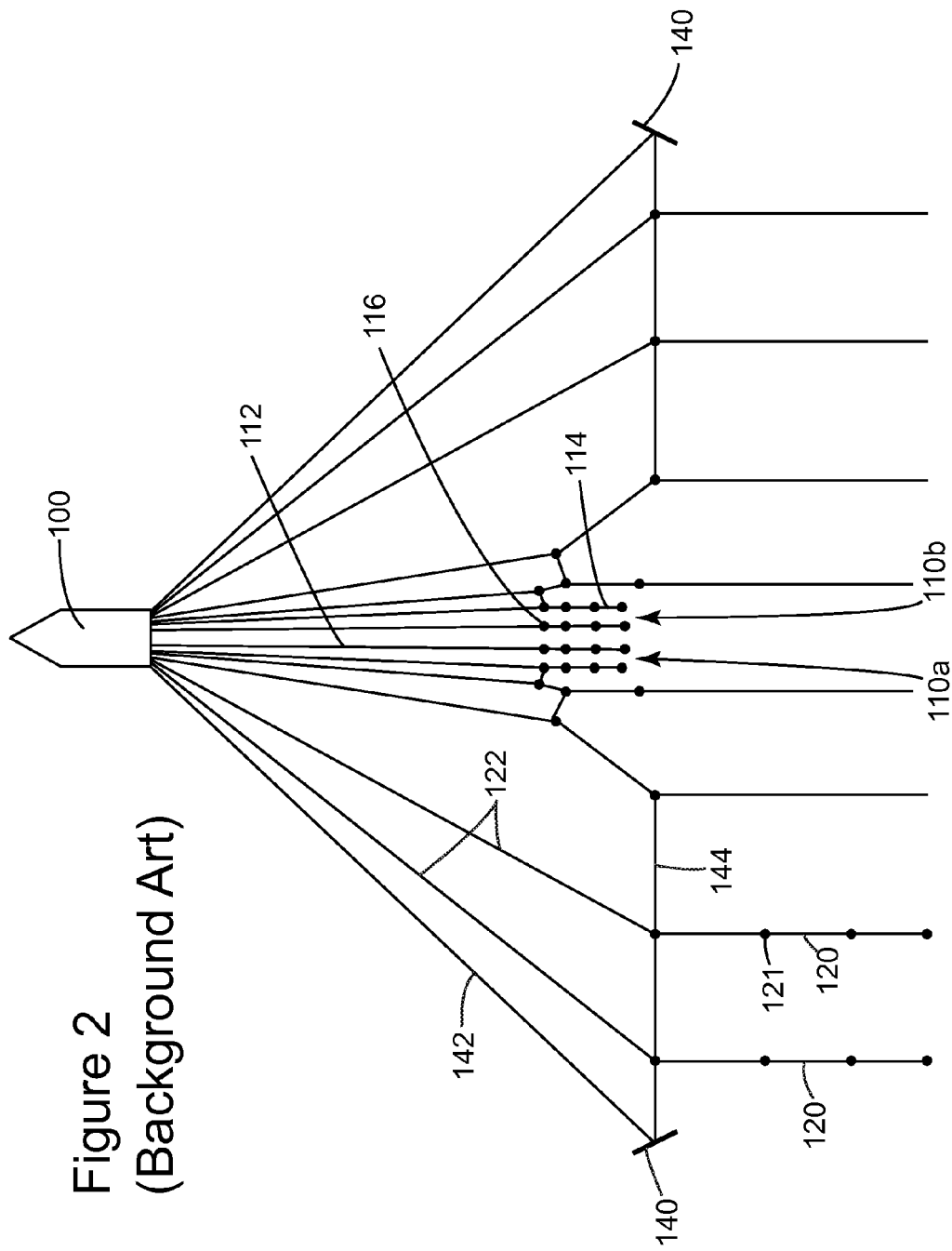
FIG. 2 is a top view of a conventional seismic survey system.
Figure 3:
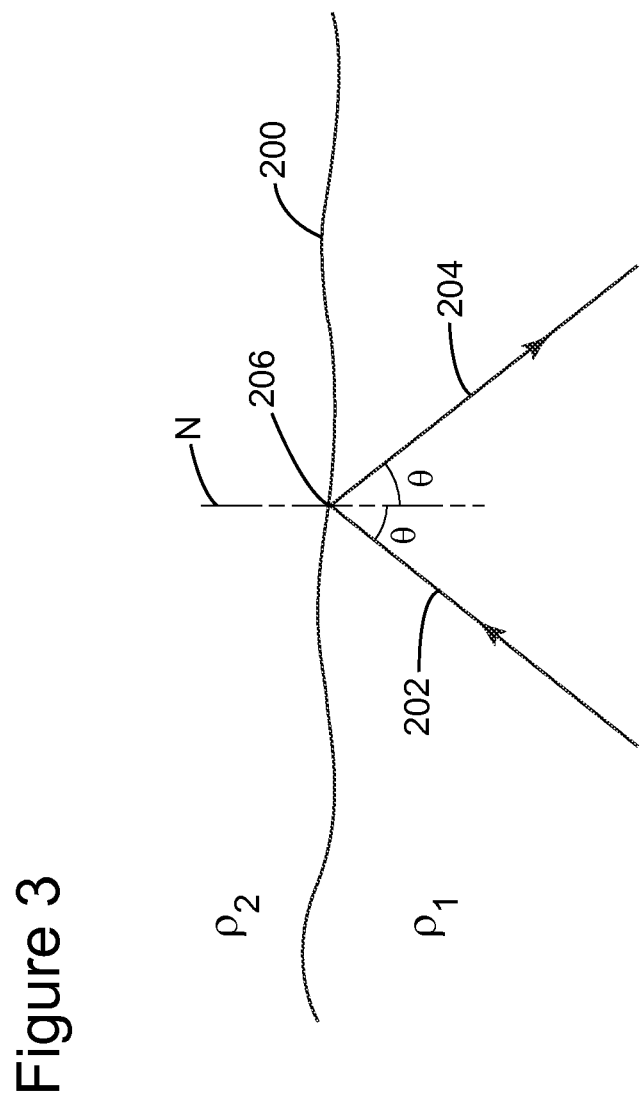
FIG. 3 is a schematic illustration of a reflection of a pressure wave.

The origin of the source ghosting discussed in the Background section can be traced to the properties of water and air that form the interface above the sources when towed under water. As discussed above, when pressure waves generated by the source array arrive at the water-air interface, a reflection of the waves occurs. As shown in FIG. 3, the water-air interface 200 is shown separating the water having a density $\rho_1$ from the air having a density $\rho_2$. A pressure wave 202 traveling upwards is reflected at the interface 200 so that an angle θ between the incident wave 202 and a normal N to the interface 200 is the same with an angle between a reflected wave 204 and the normal N.

Further, a coefficient of reflection R at point 206 on the interface 200 is given by:

$$R = \frac{v_2\rho_2 - v_1\rho_1}{v_2\rho_2 + v_1\rho_1},$$

where $v_1$ is the speed of sound in water, $v_2$ is the speed of sound in air, $\rho_1$ is the density of water and $\rho_2$ is the density of air. By substituting the typical values for these parameters, i.e., $v_1$=1500 m/s, $v_2$=330 m/s, $\rho_1$=1 and $\rho_2$=0 (in reality, the air density is not zero but very small and, for practical reasons, it is considered to be zero), the coefficient of reflectivity is found to be R=−1. This means that the water-air interface behaves as a mirror and a polarity of the incident pressure waves is reversed (because of the minus sign) after reflection.

The inventor of the present invention has observed that if a coverage plate with reflection larger than −1 is provided above the individual source elements, e.g., between the individual source elements and the water-air interface, then some of the reflected energy from certain frequency band (reflected from the coverage plate) that travels downward and is responsible for the source notch may be made to not have a reversed polarity as the coefficient of reflection of the plate is positive or zero. In this way, the destructive interference between the ghost signal and the directly downward-propagating signal may be reduced.

To achieve a coverage plate that has positive reflection (i.e., R larger than or equal to zero), the product of the density of the plate and the speed of sound in the plate needs to be equal to or larger than the product of the water density and the speed of sound in water. Examples of such materials may include metals, plastics, etc. Further, such coverage plate may form the float itself (to be discussed later) or may be attached to the float.

Figure 4:
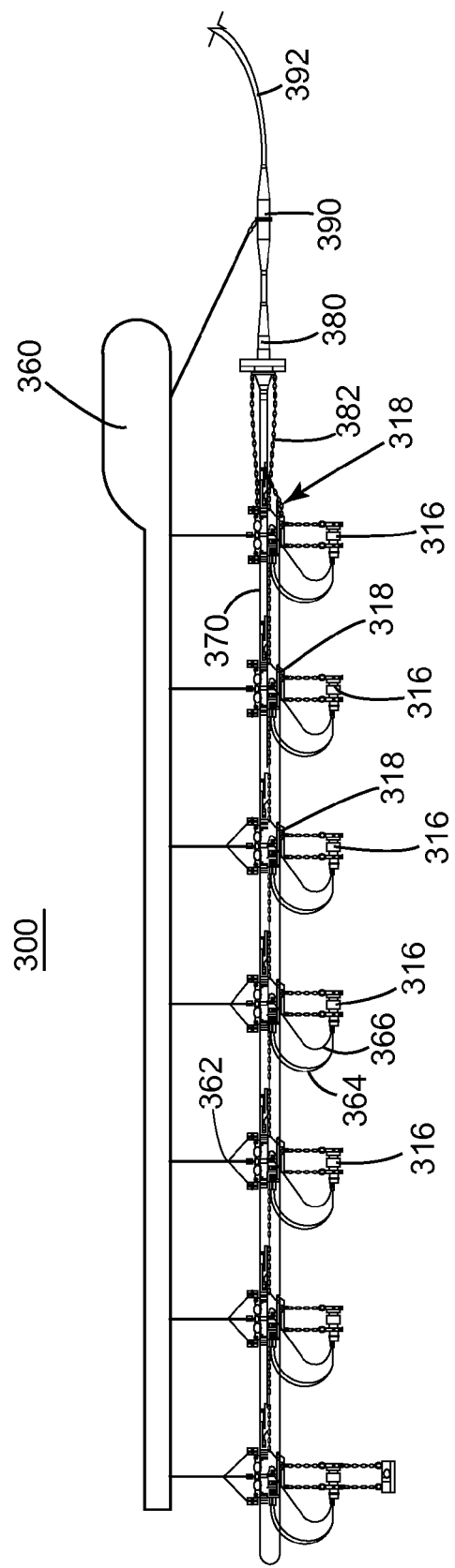
FIG. 4 is a schematic diagram of a source sub-array having a coverage plate according to an exemplary embodiment.

According to an exemplary embodiment illustrated in FIG. 4, a single sub-array 300 of a source array includes one or more floats 360 from which the individual source elements 316 are suspended with cables or ropes 362 (which may have, in one application, a length of around 5 m). In one application, clusters of individual source elements are provided at the location 316. Various cables connect the individual source elements 316 to the vessel for providing electric power, compressed air, data transmission, etc. For example, a cable 364 provides compressed air and a cable 366 provides electric power and/or data transmission.

The individual source elements 316 may be attached to the source bases 318. Source bases 318 are connected to each other via links 370 and also to a bell housing 380 via a connection 382. In one application, the links 370, bell housing 380 and the connection 382 may form an enclosure in which the various cables 364 and 366 are entering. The bell housing 380 may be made of a resistant material, for example, stainless steel. A bend restrictor device 390 may be connected to the bell housing 380 and also to the vessel (not shown) via an umbilical 392. The bend restrictor device 390 is configured to prevent an over-bending of the front part of the source array due to the towing force applied via the umbilical 392.

Figure 5:
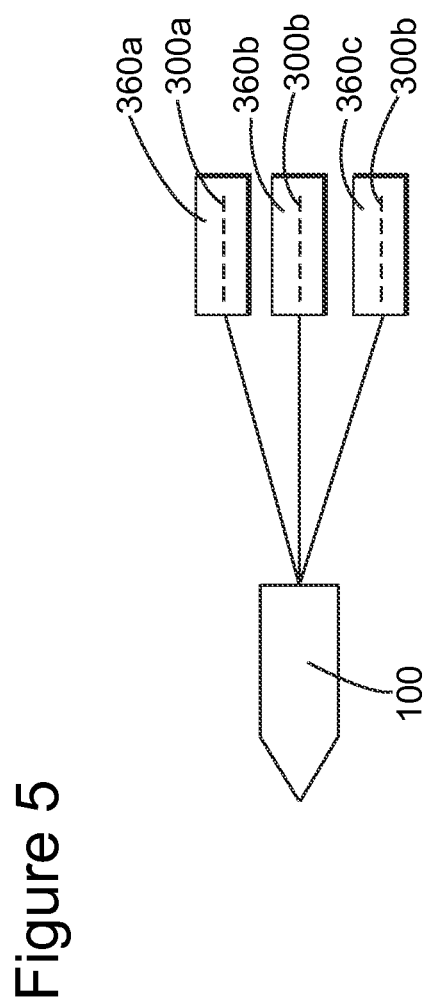
FIG. 5 is a schematic diagram of three source sub-arrays having corresponding coverage plates and being towed by a vessel according to an exemplary embodiment.
Figure 6:
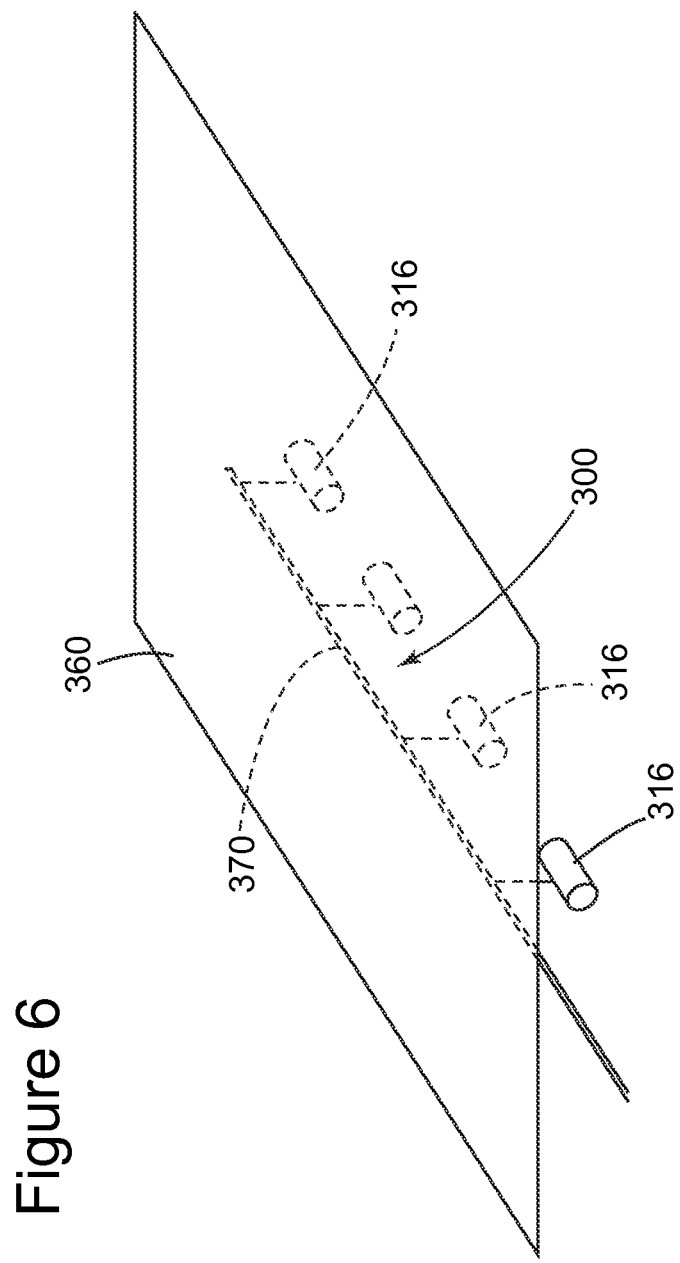
FIG. 6 is a top view of a coverage plate used as a float in an exemplary embodiment.

In this exemplary embodiment, the float 360 is made of a material so that it has a zero or positive coefficient of reflection R and, thus, the float acts as the positive reflection coverage plate. A top view of multiple floats/coverage plates 360a-c is shown in FIG. 5. Each float/coverage plate 360a-c is configured to support its own sub-array 300a-c. FIG. 6 shows a single float/coverage plate 360 and a corresponding sub-array 300. The sub-array 300 includes plural individual source elements 316 that are supported by the float/coverage plate 360.

According to an exemplary embodiment, for a traditional sub-array that has a length of 15 m, a length of the float/coverage plate 360 may be approximately 21 m and its width may be approximately 7 m. According to an exemplary embodiment, the surface area of the coverage plate is larger than 100 square meters. Thus, it is noted that the float/coverage plate 360 is quite different from a traditional float as its total surface area is large (tens to hundreds of square meters) compared to the surface area of a traditional float. Of course, the numbers presented above are just an example and the size of the float/coverage plate may be smaller or larger depending on the size of the source array, the depth of the source array, etc.

Figure 7:
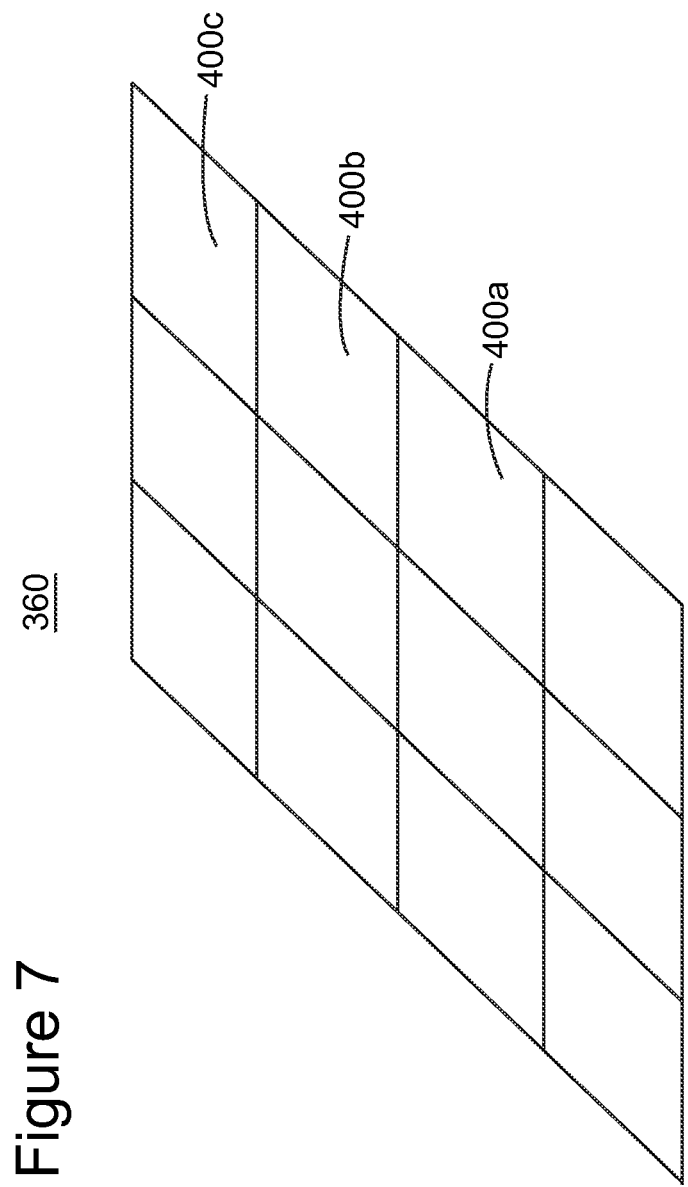
FIG. 7 is a top view of a coverage plate made of plural elements according to an exemplary embodiment.
Figure 8:
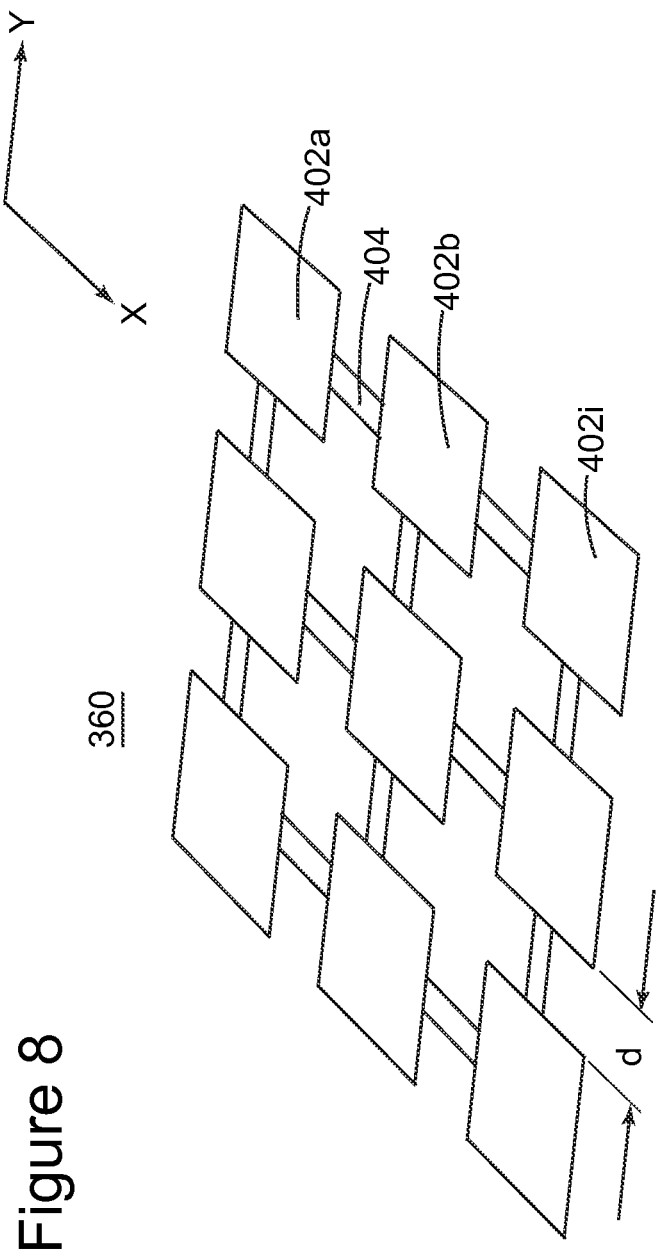
FIG. 8 is a top view of a coverage plate made of plural elements separated by predetermined distances according to an exemplary embodiment.

The float/coverage plate 360 does not have to be made of a single piece. For example, as shown in FIG. 7, the float/coverage plate 360 may include plural pieces 400a-c that are connected to each other. These pieces may be tightly connected to each other (i.e., the distance between adjacent pieces is negligible) or predetermined distances "d" may be implemented between the various pieces 402i as illustrated in FIG. 8. The distances d (which may be different on X and Y axes) may be achieved by using links 404 to connect the pieces one to the other. The links 404 may be configured so that the pieces 402i may be folded one over the other to reduce the total size of the float when removed or deployed in the water.

Figure 9:
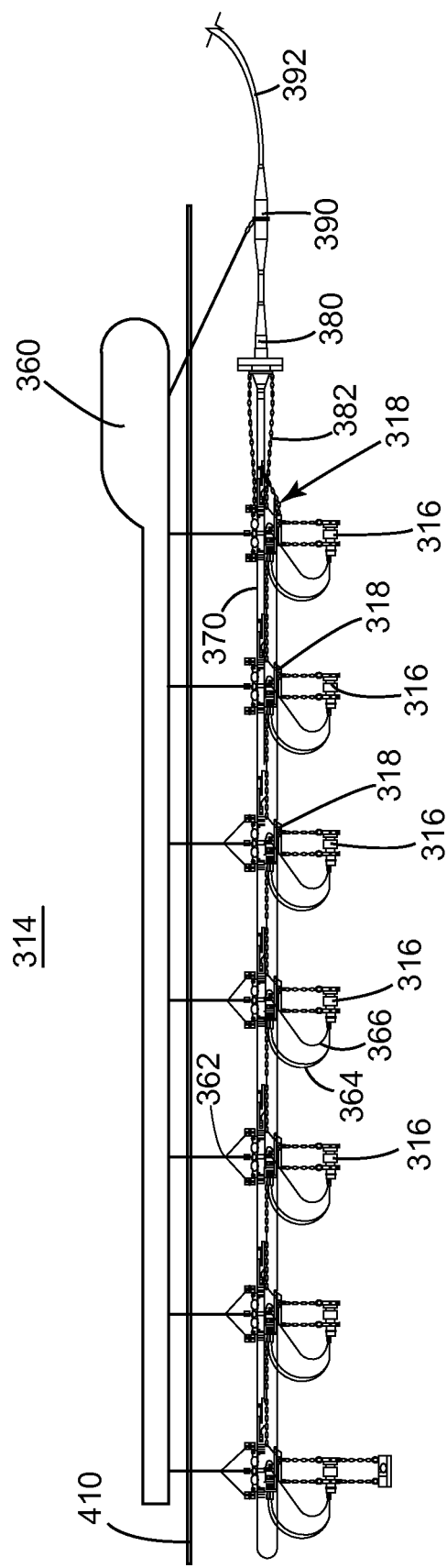
FIG. 9 is a schematic diagram of a source sub-array with a coverage plate located between a float and individual source elements according to an exemplary embodiment.
Figure 10:
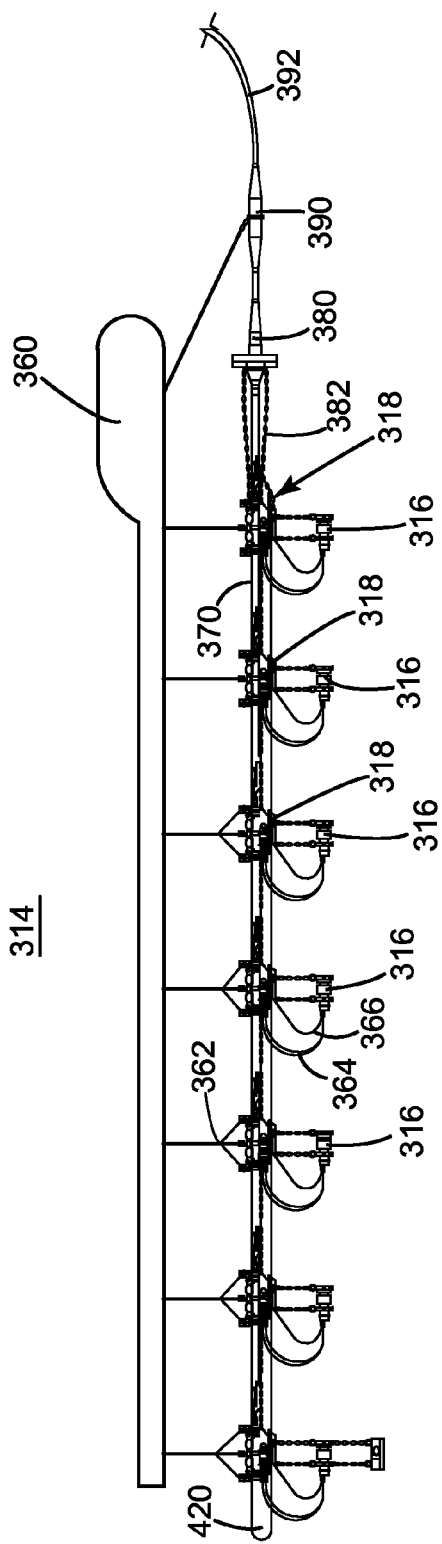
FIG. 10 is a schematic diagram of another source sub-array with a coverage plate located between a float and individual source elements according to an exemplary embodiment.

The coverage plate may not necessarily be made to also be the float. In other words, according to exemplary embodiments illustrated in FIGS. 9 and 10, a positive reflection coverage plate may be provided between the float 360 and the individual source elements 316. FIG. 9 illustrates an embodiment in which a coverage plate 410 is located above the source bases 318 and below the float 360, while FIG. 10 illustrates an embodiment in which a coverage plate 420 includes the source bases 318. Other positions of the coverage plate may be envisioned as long as the coverage plate is located above the individual source elements.

Figure 11:
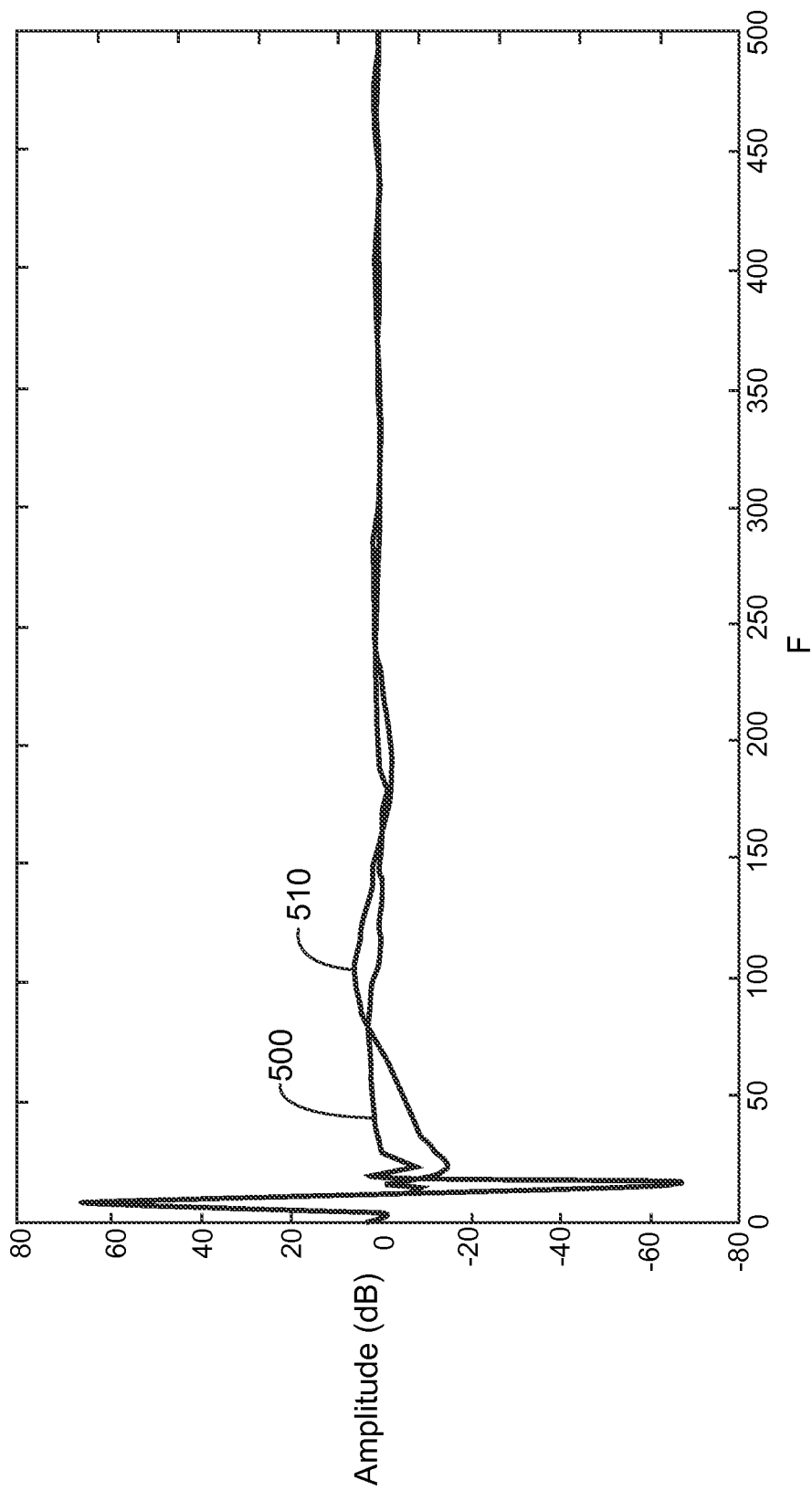
FIG. 11 is a graph of a far-field signature of a source sub-array with and without coverage plate according to an exemplary embodiment.
Figure 12:
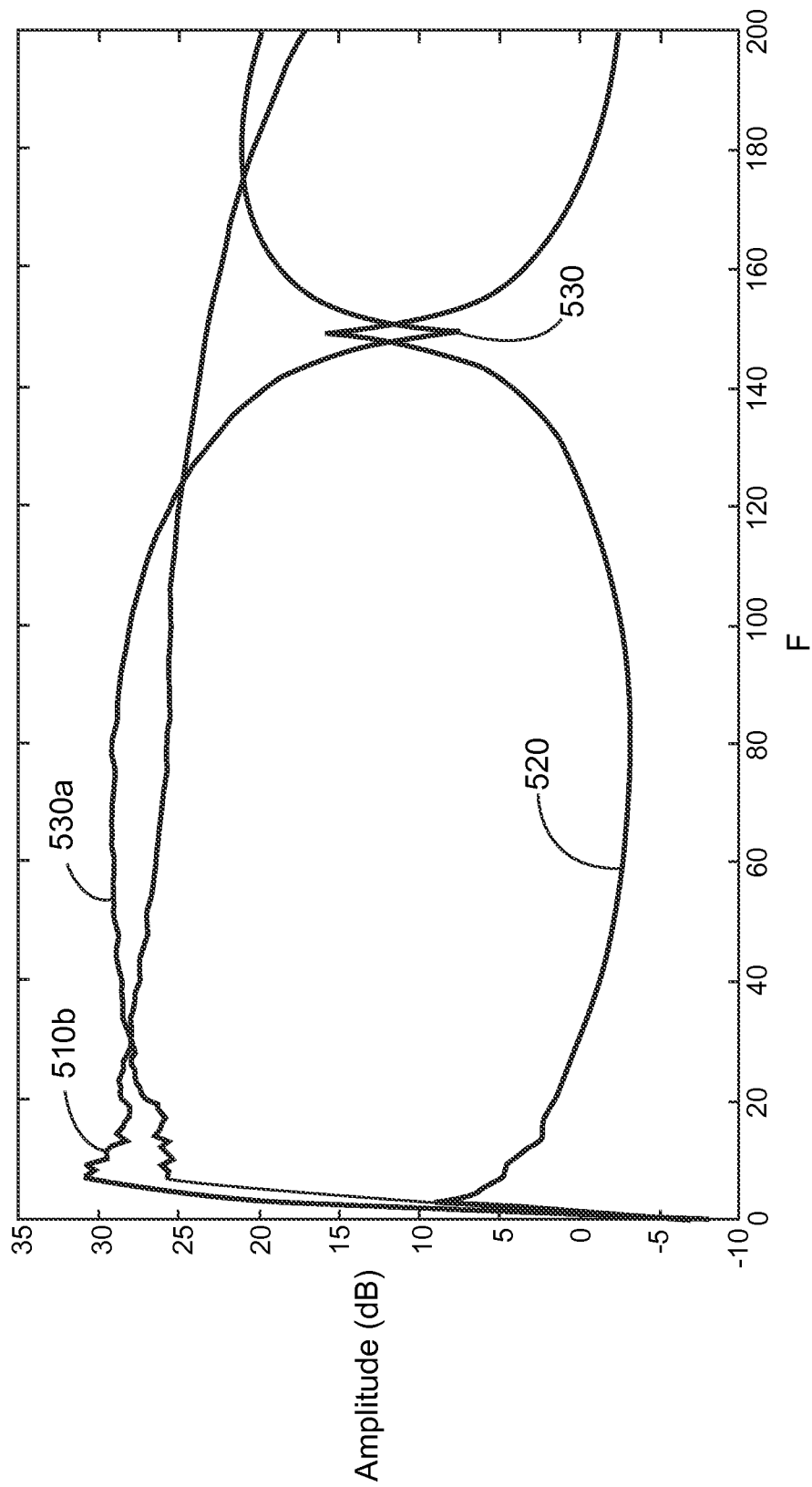
FIG. 12 is a graph of a spectrum of a source sub-array with and without coverage plate according to an exemplary embodiment.

Advantages of having a positive reflection coverage plate over the individual source elements are discussed now with regard to FIGS. 11 and 12. Assuming that the size of the coverage plate is 21 m by 7 m, the water reflection coefficient is −1 and the coverage plate coefficient is 0.5, a far-field signal (e.g., vertically at a depth of 9 km) of the source without the coverage plate is represented by curve 500, and the same quantity for the same source with the coverage plate is represented by curve 510 in FIG. 11. FIG. 12 shows the spectrum for the two cases, with curve 500a representing the spectrum for the source with no coverage plate and curve 510a representing the spectrum for the source with coverage plate. A gain in energy of the source with coverage plate relative to the source with no coverage plate is shown by curve 520 in FIG. 12. It is noted a gain of about 10 dB for low frequencies for the source with the coverage plate and also an almost total reduction of the notch 530 of the spectrum of the source with no coverage plate.

According to an exemplary embodiment illustrated in FIG. 13, there is a method for performing a seismic survey in a body of water. The method includes a step 1300 of towing a source array that includes at least one sub-array; a step 1302 of firing individual source elements of the sub-array such that sound waves upwardly generated by at least one sub-array are partially reflected from a coverage plate provided above at least one sub-array; and a step 1304 of reflecting the sound waves with positive or zero polarity at the coverage plate.

One or more of the exemplary embodiments discussed above provide a source array with a positive reflection coverage plate for reducing the source ghosting effect when towing the source array under water. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A marine source sub-array for generating a pressure wave in a body of water, the marine source sub-array comprising:
 a float configured to float in the body of water;
 base plates connected to the float through cables;
 plural individual source elements connected to the base plates and configured to generate pressure waves underwater; and a coverage plate located between the plural individual source elements and the float,
wherein the coverage plate has a surface area larger than a surface area of the float.

2. The source sub-array of claim 1, wherein a reflection coefficient of the coverage plate for pressure waves coming from the body of water is zero or positive.

3. The source sub-array of claim 1, wherein the surface area of the coverage plate is larger than 100 square meters when a length of the sub-array is around 15 m.

4. The source sub-array of claim 1, wherein the coverage plate is made of plural elements connected to each other by links.

5. The source sub-array of claim 4, wherein the plural elements are foldable.

6. The source sub-array of claim 1, wherein the coverage plate is located above the base plates.

7. The source sub-array of claim 1, wherein the coverage plate includes the base plates.

8. The source sub-array of claim 1, wherein sound waves upwardly generated by the plural individual source elements are partially reflected from the float and partially reflected from the coverage plate.

9. A marine source sub-array for generating a pressure wave in a body of water, the marine source sub-array comprising:
    a float configured to float in the body of water;
    base plates connected to the float through cables; and
    plural individual source elements connected to the base plates and configured to generate pressure waves underwater,
    wherein a reflection coefficient of the float for pressure waves coming from the body of water is zero or positive.

10. The source sub-array of claim 9, wherein a surface area of the float is larger than 100 square meters when a length of the sub-array is around 15 m.

11. The source sub-array of claim 9, wherein the float is made of plural elements connected to each other by links.

12. The source sub-array of claim 11, wherein the plural elements are foldable.

13. A marine source array for generating a pressure wave in a body of water, the marine source array comprising:
    three source sub-array configured to be towed by a vessel, at least one source sub-array including,
    a float configured to float in the body of water,
    base plates connected to the float through cables,
    plural individual source elements connected to the base plates and configured to generate sound waves underwater, and
    a coverage plate located between the plural individual source elements and the float,
    wherein the coverage plate has a surface area larger than a surface area of the float.

14. The source array of claim 13, wherein a reflection coefficient of the coverage plate for sound waves coming from the body of water is zero or positive.

15. The source array of claim 13, wherein the surface area of the coverage plate is larger than 100 square meters when a length of the sub-arrays is around 15 m.

16. The source array of claim 13, wherein the coverage plate is made of plural elements connected to each other by links.

17. The source array of claim 16, wherein the plural elements are foldable.

18. A method for performing a seismic survey in a body of water, the method comprising:
    towing a source array that includes at least one sub-array;
    firing individual source elements of the sub-array such that sound waves upwardly generated by the at least one sub-array are partially reflected from a coverage plate provided above the at least one sub-array; and
    reflecting the sound waves with positive or zero polarity at the coverage plate.

19. The method of claim 18, further comprising:
    locating the coverage plate between individual source elements and a float of the at least one sub-array.

20. The method of claim 18, further comprising:
    selecting a material of the coverage plate so that the coverage plate floats in water.

* * * * *